2 Sheets--Sheet 2.

D. N. SWISHER & E. P. CAMPBELL.
Bolting-Chest.

No. 167,362. Patented Aug. 31, 1875.

WITNESSES:
P. C. Dieterich
W. C. McArthur

INVENTORS:
D. N. Swisher
E. P. Campbell
per J. H. Alexander
ATTORNEY.

UNITED STATES PATENT OFFICE.

DAVID N. SWISHER AND ELI P. CAMPBELL, OF TROY, OHIO.

IMPROVEMENT IN BOLTING-CHESTS.

Specification forming part of Letters Patent No. 167,362, dated August 31, 1875; application filed April 15, 1875.

*To all whom it may concern:*

Be it known that we, D. N. SWISHER and E. P. CAMPBELL, of Troy, in the county of Miami and State of Ohio, have invented certain new and useful Improvements in Bolting-Chests; and we do hereby declare that the following is a full, clear, and exact description thereof, reference being had to the accompanying drawings, and to the letters of reference marked thereon, which form part of this specification.

The nature of our invention consists in the construction and arrangement of a bolting-chest, as will be hereinafter more fully set forth.

In order to enable others skilled in the art to which our invention appertains to make and use the same, we will now proceed to describe its construction and operation, referring to the annexed drawings, in which—

Figure 1:
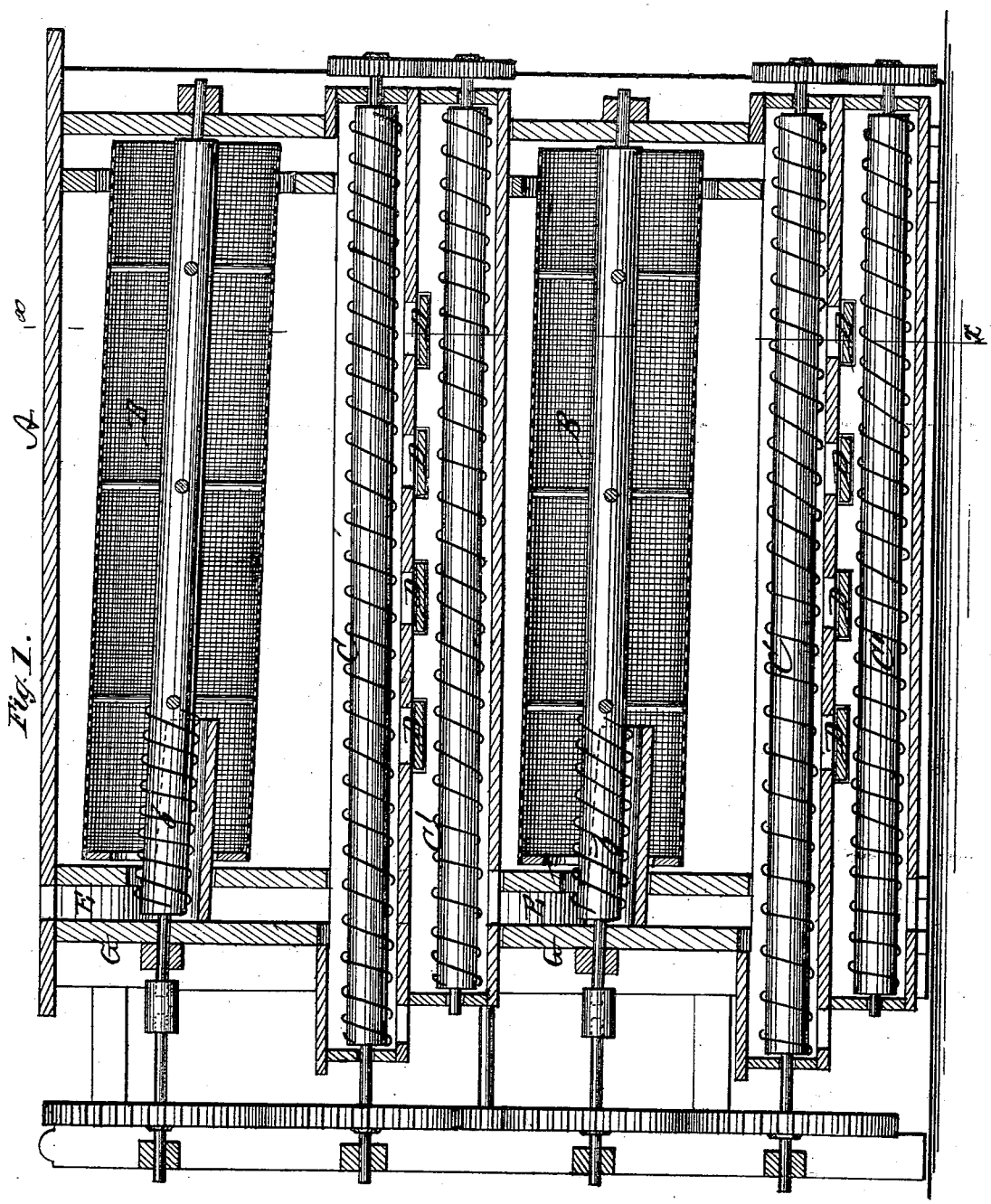
Figure 2:
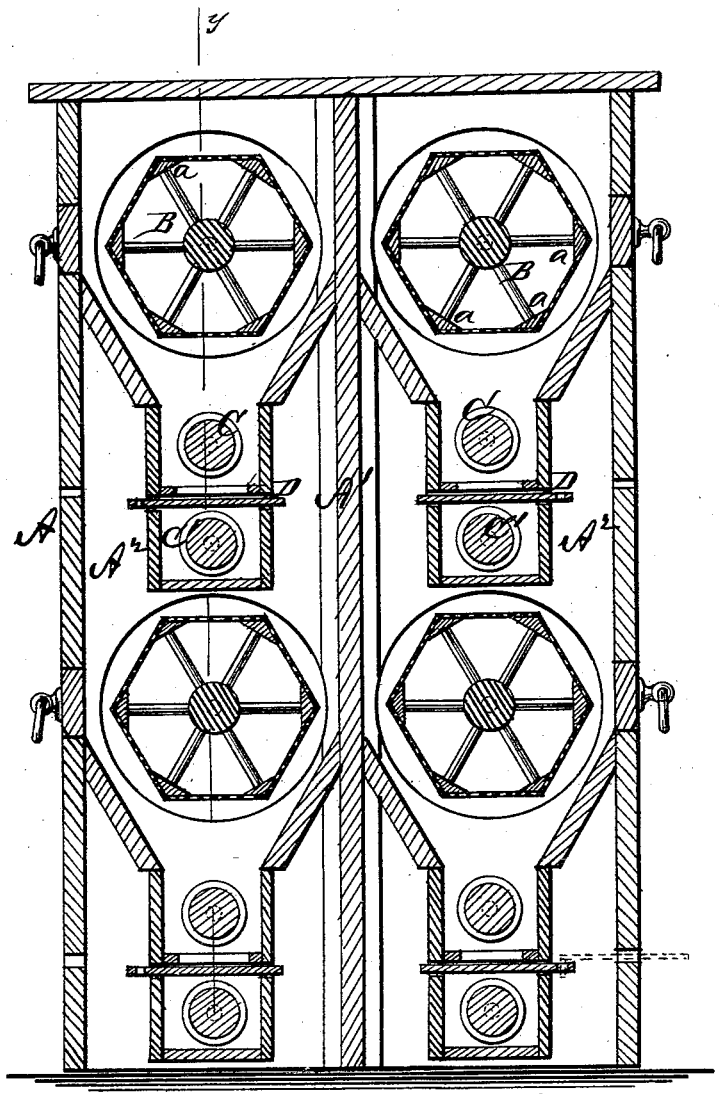

Figure 1 is a longitudinal vertical section of our bolting-chest, through the line $yy$, Fig. 2. Fig. 2 is a transverse vertical section of the same, through the line $xx$, Fig. 1.

A represents the bolting-chest, divided by means of a longitudinal vertical partition, $A^1$, into two compartments, $A^2\ A^2$. In each of these compartments are arranged two, three, or more reels, B B, one above the other, with conveyors C C' under each reel. We obtain a continuous feed by admitting the chop from the burr into the top reel of one compartment, and then passing continuously through all the reels on that side of the chest, and then elevated by a suitable elevator arranged in connection with the chest to the upper reel on the other side of the chest, and a continuous feed through all the reels on that side. The reels all pitch one way, and the chop, as it passes out of each reel, is taken back by means of an extra conveyor, C', to the high end of the next reel below, and passes continuously through all the reels on that side, making no returns; and then the coarse chop, after taking out all the flour, passes into a middlings-separator. Better flour is made by having the reels all pitching one way, which keeps all the dustings or flyings at the tail end of all the reels at one end of the chest. The reels are formed with V-shaped ribs $a$, which give a smooth surface on the inside, doing away with all interruption of meal or chop passing around on the inside of the reel. A greater or less quantity of flour may be cut off from each reel by means of a series of slides, D D, arranged between the two conveyors, C C', for each reel, so as to make ten or twelve different grades of flour, if required. By means of the slides we can bolt for one to six run of burr with the same exactness; and, if desired, we can use one side of the chest for one grade of wheat, and the other side for another grade. More flour will be made out of the same quantity of wheat by having the benefit of all the reels at one time, and the miller having perfect control of his bolting. The chop does not enter the reels by spouts, but is thrown into a gatherer, E, at the upper end of each reel, and fed gently onto the cloth by means of a feeder, $b$, attached to that end of the reel-shaft. Each reel is also provided with an extra dust-head, G, which will catch all the flyings that may possibly fly out at the head end.

Having thus fully described our invention, what we claim as new, and desire to secure by Letters Patent, is—

In a bolting-chest, the combination of slanting reels B B with ribs $a\ a$, conveyors C C C' C', slides D D, gatherers E E, and feeders $b\ b$, all constructed and arranged as herein set forth.

In testimony that we claim the foregoing as our own we affix our signatures in presence of two witnesses.

DAVID N. SWISHER.
          ELI P. CAMPBELL.

Witnesses:
  CALVIN D. WRIGHT,
  AARON LOVEJOY.